US012655573B2

(12) United States Patent
Rajendran

(10) Patent No.: US 12,655,573 B2
(45) Date of Patent: Jun. 16, 2026

(54) DRYER PERFORMANCE CUSTOMER FEEDBACK

(71) Applicant: WHIRLPOOL CORPORATION, Benton Harbor, MI (US)

(72) Inventor: Arun Rajendran, St. Joseph, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 870 days.

(21) Appl. No.: 18/059,734

(22) Filed: Nov. 29, 2022

(65) Prior Publication Data

US 2024/0175197 A1 May 30, 2024

(51) Int. Cl.
D06F 58/38 (2020.01)
D06F 34/04 (2020.01)
(Continued)

(52) U.S. Cl.
CPC .............. D06F 58/38 (2020.02); D06F 34/04 (2020.02); D06F 34/20 (2020.02); D06F 34/32 (2020.02); D06F 58/44 (2020.02); G05B 19/042 (2013.01); D06F 2101/02 (2020.02); D06F 2103/40 (2020.02); D06F 2105/12 (2020.02);
(Continued)

(58) Field of Classification Search
CPC .......... D06F 58/38; D06F 34/04; D06F 34/20; D06F 34/32; D06F 58/44; D06F 2101/02; D06F 2103/40; D06F 2105/12; D06F 2105/14; D06F 2105/56; D06F 2105/60;

D06F 58/36; D06F 58/46; D06F 2101/00; D06F 2103/04; D06F 2103/46; D06F 2105/20; D06F 2105/52; G05B 19/042; G05B 2219/2633
See application file for complete search history.

(56) References Cited

U.S. PATENT DOCUMENTS 10,054,911 B2 * 8/2018 Scheckelhoff ........ H04L 12/282
10,905,304 B2 2/2021 Beaudet et al.
(Continued)

FOREIGN PATENT DOCUMENTS

DE 102008042290 B4 5/2021
WO 2018192111 A1 10/2019
(Continued)

*Primary Examiner* — Jessica Yuen
(74) *Attorney, Agent, or Firm* — BROOKS KUSHMAN P.C.

(57) ABSTRACT

Selecting cycle modifiers for a clothes dryer is provided. Responsive to a requested cycle of operation for drying a load and a previous cycle being the same cycle type, and further responsive to historical information for the previous cycle indicating positive user feedback that dryness of the load was correct, cycle modifiers corresponding to the requested cycle are applied, and the clothes dryer is operated without soliciting further user feedback. Responsive to the requested cycle and the previous cycle being different cycle types, or responsive to the historical information for the previous cycle indicating negative user feedback that dryness of the load was incorrect, apply the cycle modifiers corresponding to the requested cycle, operate the clothes dryer, and solicit further user feedback with respect to the cycle of operation of the clothes dryer to update cycle modifiers for use in future cycles of the same cycle of operation.

20 Claims, 6 Drawing Sheets

(51) Int. Cl.

| | | |
|---|---|---|
| *D06F 34/20* | (2020.01) | |
| *D06F 34/32* | (2020.01) | |
| *D06F 58/44* | (2020.01) | |
| *D06F 101/02* | (2020.01) | |
| *D06F 103/40* | (2020.01) | |
| *D06F 105/12* | (2020.01) | |
| *D06F 105/14* | (2020.01) | |
| *D06F 105/56* | (2020.01) | |
| *D06F 105/60* | (2020.01) | |
| *G05B 19/042* | (2006.01) | |

(52) U.S. Cl.
CPC ...... *D06F 2105/14* (2020.02); *D06F 2105/56* (2020.02); *D06F 2105/60* (2020.02); *G05B 2219/2633* (2013.01)

(56)                        References Cited

U.S. PATENT DOCUMENTS

| | | | | |
|---|---|---|---|---|
| 2006/0156764 | A1* | 7/2006 | Baggio | D06F 34/28 68/19 |
| 2008/0072448 | A1* | 3/2008 | Hubig | D06F 58/38 34/446 |
| 2021/0102328 | A1 | 4/2021 | Park | |
| 2022/0243387 | A1* | 8/2022 | Zhou | D06F 58/38 |

FOREIGN PATENT DOCUMENTS

| | | | |
|---|---|---|---|
| WO | 2021047898 | A | 3/2021 |
| WO | 2021047899 | A1 | 3/2021 |

* cited by examiner

DRYER PERFORMANCE CUSTOMER FEEDBACK

TECHNICAL FIELD

Disclosed herein are approaches for improving appliance performance based on customer feedback solicited by the appliance.

BACKGROUND

Laundry treating appliances, such as clothes washers, clothes dryers, and refreshers, for example, may have a configuration based on a rotating drum that defines a treating chamber in which laundry items are placed for treating according to a cycle of operation. The laundry treating appliance may have a controller that implements a number of pre-programmed cycles of operation having one or more operating parameters. The cycle of operation may be selected manually by the user or automatically based on one or more conditions determined by the controller.

In some laundry treating appliances, one or more operating parameters may be set based on a type, e.g., fabric type and/or fabric mix, of laundry placed inside of the treating chamber. The type of laundry may be provided by a user or automatically detected by the laundry treating appliance. In other laundry treating appliances, one or more operating parameters may be set based on the moisture content of the load of laundry.

SUMMARY

In one or more illustrative examples, a method for selecting cycle modifiers for a clothes dryer is provided. The method includes responsive to a requested cycle of operation for drying a load and a previous cycle being the same cycle of operation, and further responsive to historical information for the previous cycle indicating positive user feedback that dryness of the load was correct: applying cycle modifiers corresponding to the requested cycle, and operating the clothes dryer without soliciting further user feedback. The method further includes responsive to the requested cycle and the previous cycle being different cycles of operation, or responsive to the historical information for the previous cycle indicating negative user feedback that the dryness of the load was incorrect: applying the cycle modifiers corresponding to the requested cycle, operating the clothes dryer, soliciting the further user feedback with respect to the cycle of operation of the clothes dryer, and updating the cycle modifiers, for use in future cycles of the same cycle of operation, based on the further user feedback.

In one or more illustrative examples, a clothes dryer for selecting automatic cycle modifiers includes a memory storing historical information for each cycle of a plurality of different cycles of operation of the clothes dryer; a user interface; and a controller, programmed to responsive to a requested cycle of operation for drying a load and a previous cycle being the same cycle of operation, and further responsive to the historical information for the previous cycle indicating positive user feedback that dryness of the load was correct: apply cycle modifiers corresponding to the requested cycle, and operate the clothes dryer without soliciting further user feedback; and responsive to the requested cycle and the previous cycle being different cycles of operation, or responsive to the historical information for the previous cycle indicating negative user feedback that the dryness of the load was incorrect: apply the cycle modifiers corresponding to the requested cycle, operate the clothes dryer, solicit the further user feedback with respect to the cycle of operation of the clothes dryer, and update the cycle modifiers, for use in future cycles of the same cycle of operation, based on the further user feedback.

In one or more illustrative examples, a non-transitory computer-readable medium comprises instructions that, when executed by a controller of a clothes dryer, cause the clothes dryer to perform operations including to store, to a memory of the clothes dryer, historical information for each cycle of a plurality of different cycles of operation of the clothes dryer; responsive to a requested cycle of operation for drying a load and a previous cycle being the same cycle of operation, and further responsive to the historical information for the previous cycle indicating positive user feedback that dryness of the load was correct: apply cycle modifiers corresponding to the requested cycle, and operate the clothes dryer without soliciting further user feedback; and responsive to the requested cycle and the previous cycle being different cycles of operation, or responsive to the historical information for the previous cycle indicating negative user feedback that the dryness of the load was incorrect: apply the cycle modifiers corresponding to the requested cycle, operate the clothes dryer, solicit the further user feedback with respect to the cycle of operation of the clothes dryer, and update the cycle modifiers, for use in future cycles of the same cycle of operation, based on the further user feedback.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
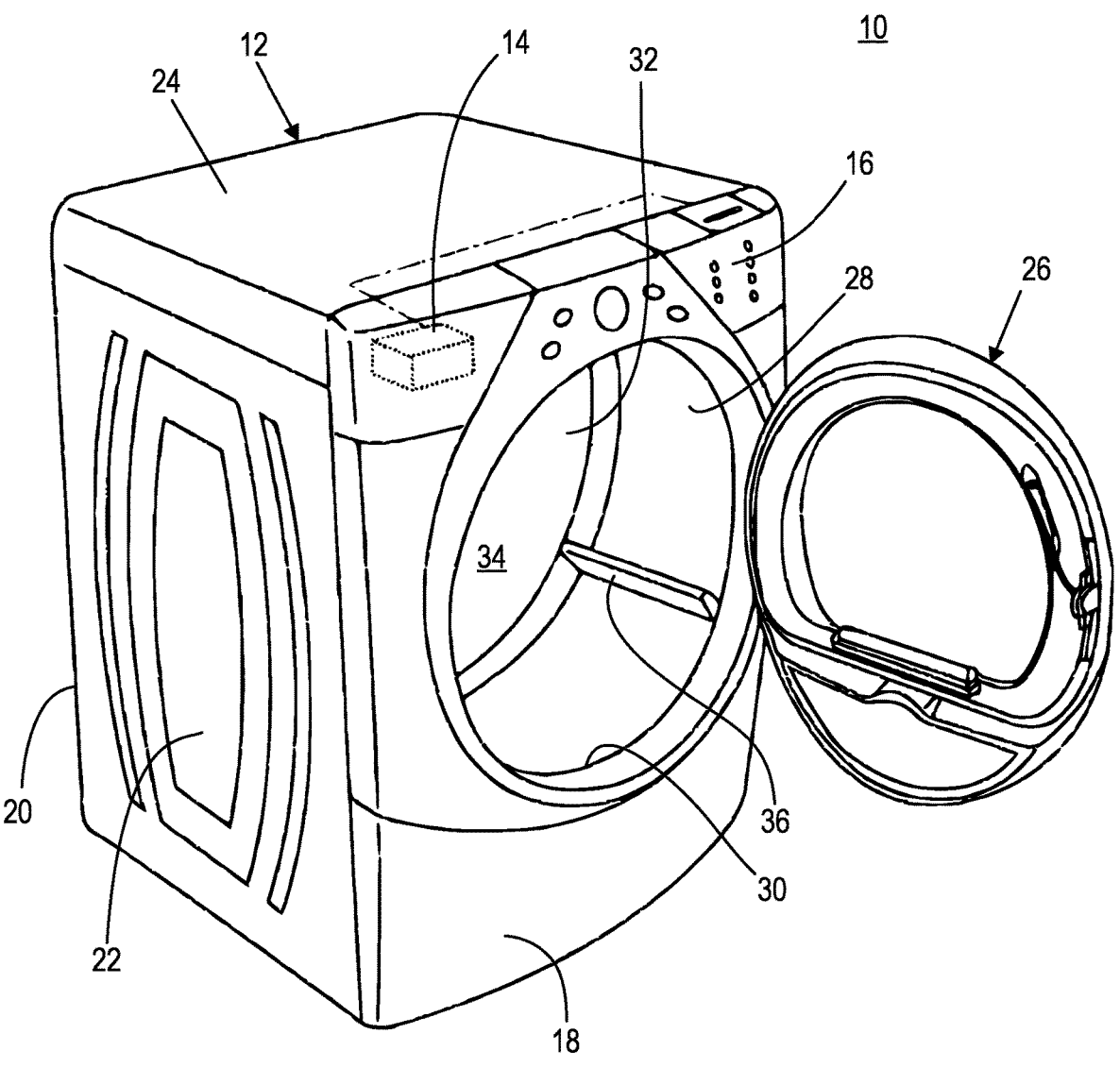
FIG. 1 is a front perspective view of a clothes dryer, wherein the clothes dryer may be controlled according to aspects of the present disclosure.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A dryer may be configured with various automatic cycles of operation. These cycles may include, for instance, a power dry cycle for heavyweight items such as towels, a normal cycle for items such as work clothes or casual wear, a wrinkle control mode for permanent press articles, a delicates cycle for undergarments, a sanitize cycle for large loads of heavyweight items, and a bedding mode for items such as comforters or jackets. The dryer may also allow the user to select from other various modifiers for the cycle, such as air temperature, wrinkle prevention modes, use of steam during the cycle, or energy saving settings. The user of the appliance may place a load into the appliance, select one of the cycles, and press start.

If the user finds that, over time, the result of the automatic cycle is consistently too wet or too crisp than the user would like, the user may change the default settings to increase or decrease the default dryness level. For example, the drying settings may include a factory preset dryness level configured to dry for a default period of time, a slightly drier clothes setting configured to perform 15% more drying time, a much drier clothes setting configured to perform 30% more drying time, a slightly wetter clothes setting configured to perform 15% less drying time, and a much wetter clothes setting configured to perform 30% less drying time. The user may adjust these modifiers via the interface of the appliance to adapt to different installations, environmental conditions, or personal preferences.

A user may also extend the cycle by adding time or by running an additional cycle. Or the user may adjust the time by stopping the cycle manually, based on the user's experience from previous cycles. However, this may call for additional actions from the customer and cycle repeats.

An improved human machine interface (HMI) for the dryer may be programmed to ask a series of questions about a completed dryer cycle, where the answers to the questions are used to indicate modifiers that may be automatically selected by the dryer software for the next cycle. By using the answers input by the user, the dryer may adjust future cycles to account for the customer feedback. The questions asked to the user may relate to dryness and wrinkles in the load. The modifiers to the cycle may include to increase or decrease dryer temperature, to lengthen or shorten the drying time, to manage cool down phase, etc. The dryer may refrain from asking the questions if the same type of load or cycle is selected after a satisfactory result was achieved. The dryer may again ask the questions if a different type of load or cycle is selected, or if the user was not satisfied with the run. The HMI may include a voice interface, a visual display, or displayed to a connected app on a smartphone. Further aspects of the disclosure are discussed in detail herein.

FIG. 1 illustrates one embodiment of a laundry treating appliance in the form of a clothes dryer 10 according to aspects of the present disclosure. While the laundry treating appliance is illustrated as a front-loading dryer, the laundry treating appliance according to aspects of the present disclosure may be another appliance which performs a cycle of operation on laundry, non-limiting examples of which include a top-loading dryer, a combination washing machine and dryer; a tumbling or stationary refreshing/revitalizing machine; an extractor; a non-aqueous washing apparatus; and a revitalizing machine.

As illustrated in FIG. 1, the clothes dryer 10 may include a cabinet 12 in which is provided a controller 14 that may receive input from a user through a user interface 16 for selecting a cycle of operation and controlling the operation of the clothes dryer 10 to implement the selected cycle of operation. The clothes dryer 10 will offer the user a number of pre-programmed cycles of operation to choose from, and each pre-programmed cycle of operation may have any number of adjustable cycle modifiers. Examples of such modifiers include, but are not limited to chemistry dispensing, load size, a load color, and/or a load type.

The cabinet 12 may be defined by a chassis or frame supporting a front wall 18, a rear wall 20, and a pair of side walls 22 supporting a top wall 24. A door 26 may be hingedly mounted to the front wall 18 and may be selectively moveable between opened and closed positions to close an opening in the front wall 18, which provides access to the interior of the cabinet 12.

A rotatable drum 28 may be disposed within the interior of the cabinet 12 between opposing front and rear bulkheads 30 and 32, which collectively define a treating chamber 34 having an open face that may be selectively closed by the door 26. The drum 28 may include at least one baffle or lifter 36. In most clothes dryers 10, there are multiple lifters 36. The lifters 36 may be located along the inner surface of the drum 28 defining an interior circumference of the drum 28. The lifters 36 may facilitate movement of laundry within the drum 28 as the drum 28 rotates.

Figure 2:
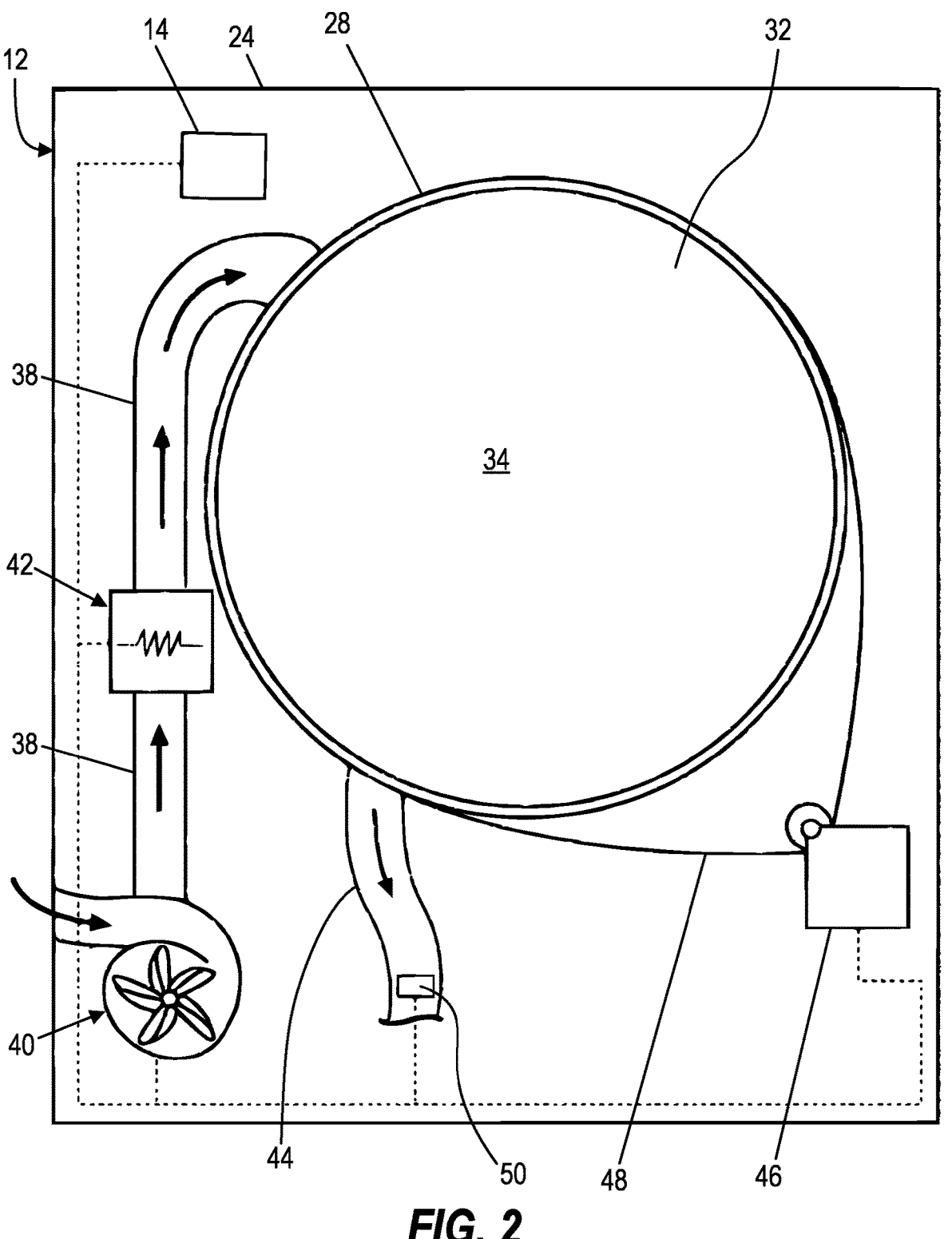
FIG. 2 is a front schematic view of the clothes dryer of FIG. 1.

Referring to FIG. 2, an air flow system for the clothes dryer 10 is schematically illustrated and supplies air to the treating chamber 34 and then exhausts air from the treating chamber 34. The air flow system may have an air supply portion that may be formed in part by a supply air conduit 38, which has one end open to the ambient air and another end fluidly coupled to the treating chamber 34. Specifically, the supply air conduit 38 may couple with the treating chamber 34 through an inlet grill (not shown) formed in the rear bulkhead 32. A fan 40 and a heater 42 may lie within the supply air conduit 38 and may be operably coupled to and controlled by the controller 14. If the heater 42 is cycled on, the supplied air will be heated prior to entering the drum 28. The air supply system may further include an air exhaust portion that may be formed in part by an exhaust air conduit 44. Operation of the fan 40 draws air into the treating chamber 34 by the supply air conduit 38 and exhausts air from the treating chamber 34 through the exhaust air conduit 44. The exhaust air conduit 44 may be fluidly coupled with a household exhaust duct (not shown) for exhausting the air from the treating chamber 34 to the outside environment. This exhaust duct may be referred to herein as a vent. However, other air flow systems are possible as well as other arrangements of the fan 40 and heater 42. For example, the fan 40 may be located in the exhaust air conduit 44 instead of the supply air conduit 38.

The clothes dryer 10 may be provided with a temperature sensor 50 to determine the temperature of the air in the exhaust air conduit 44. One example of a temperature sensor 50 is a thermocouple. The temperature sensor 50 may be operably coupled to the controller 14 such that the controller 14 receives output from the temperature sensor 50. The temperature sensor 50 may be mounted at any location in or near the exhaust air conduit 44 of the clothes dryer 10 such that the temperature sensor 50 may be able to accurately sense the temperature of the exhaust air flow. For example, the temperature sensor 50 may be coupled the cabinet 12 in the area if the exhaust air conduit 44.

The drum 28 may be rotated by a suitable drive mechanism, which is illustrated as a motor 46 and a coupled belt 48. The motor 46 may be operably coupled to the controller 14 to control the rotation of the drum 28 to complete a cycle of operation. Other drive mechanisms, such as direct drive, may also be used.

The clothes dryer 10 may also have a dispensing system (not shown) for dispensing treating chemistries into the treating chamber 34. The dispensing system may introduce treating chemistry into the drum 28 in any suitable manner, such as by spraying, dripping, or providing a steady flow of the treating chemistry. The treating chemistry may be in a form of gas, liquid, solid or any combination thereof and may have any chemical composition enabling refreshment, disinfection, whitening, brightening, increased softness, reduced odor, reduced wrinkling, stain repellency or any other desired treatment of the laundry. Water is one example of a suitable treating chemistry. Other non-limiting examples of suitable treating chemistries are chromophore chemistry, softening chemistry, and stain-repellency chemistry. In all cases, the treating chemistries may be composed of a single chemical, a mixture of chemicals, or a solution of water and one or more chemicals.

Figure 3:
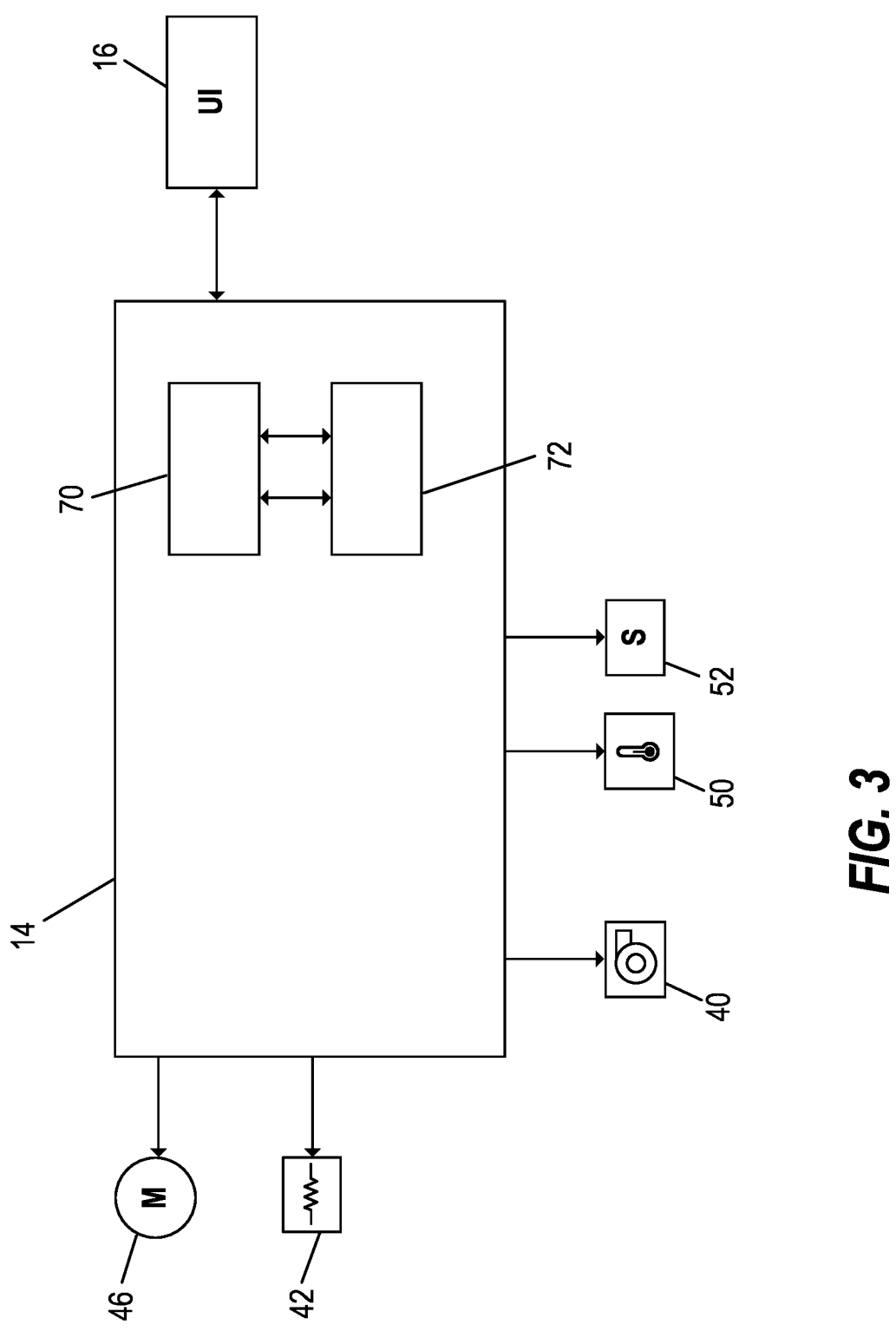
FIG. 3 is a schematic representation of a controller for controlling the operation of one or more components of the clothes dryer of FIG. 1.

As illustrated in FIG. 3, the controller 14 may be provided with a memory 70 and a central processing unit (CPU) 72. The memory 70 may be used for storing the control software that may be executed by the CPU 72 in completing a cycle of operation using the clothes dryer 10 and any additional software. The memory 70 may also be used to store information, such as a database or table, and to store data received from the one or more components of the clothes dryer 10 that may be communicably coupled with the controller 14.

The controller 14 may be operably coupled with one or more components of the clothes dryer 10 for communicating with and/or controlling the operation of the component to complete a cycle of operation. For example, the controller 14 may be coupled with the fan 40 and the heater 42 for controlling the temperature and flow rate of the air flow through the treating chamber 34; the motor 46 for controlling the direction and speed of rotation of the drum 28; the temperature sensor 50 for receiving information about the temperature of the exhaust air flow; and the user interface 16 for receiving user selected inputs and communicating information to the user. The controller 14 may also receive input from various additional sensors 52, which are known in the art and not shown for simplicity. Non-limiting examples of additional sensors 52 that may be communicably coupled with the controller 14 include: a treating chamber 34, a temperature sensor 50, a supply air flow temperature sensor 50, a moisture sensor, an air flow rate sensor, a weight sensor, and a motor torque sensor.

Figure 4:
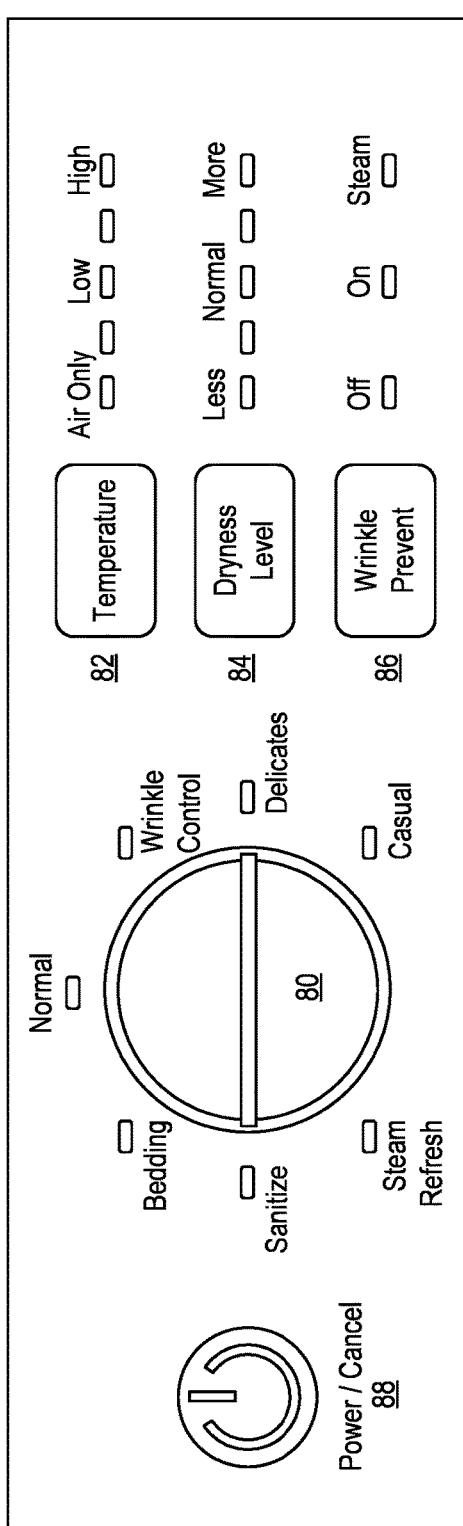
FIG. 4 is an example portion of a user interface of the clothes dryer of FIG. 1.

FIG. 4 illustrates an example portion of a user interface 16 for the selection of cycles of operation. Generally, in normal operation of the clothes dryer 10, a user first selects a cycle of operation via the user interface 16. For instance, a cycle selection dial 80 may allow the user to choose among various cycles. These cycles may include, as some non-limiting examples, a normal cycle, a bedding cycle, a stream refresh cycle, a wrinkle control cycle, a delicates cycle, or a causal clothes cycle.

Each cycle may define aspects of the operation of the clothes dryer 10, such as temperature of the cycle, the length of the cycle, etc. The user may also select one or more cycle modifiers. For example, the user interface 16 may include a temperature control 82 that the user may use to choose temperature modifiers for the selected cycle, such as air only, low temperature, medium temperature, high temperature, etc. In another example, the user interface 16 may include a dryness level control 84 that the user may use to choose dryness modifiers for the selected cycle, such as less dry, normal dry, more dry, etc. In yet another example, the user interface 16 may include a wrinkle prevention control 86 that the user may use to choose wrinkle prevention modifiers, such as off, on, use steam, etc.

Once the user has chosen the cycle of operation and the modifiers, the user may press a power button 88 to initiate the cycle. In accordance with the user-selected cycle and cycle modifiers, the controller 14 may then control the operation of the rotatable drum 28, the fan 40 and the heater 42, to implement the cycle of operation to dry the laundry. When instructed by the controller 14, the motor 46 rotates the drum 28 via the belt 48. The fan 40 draws air through the supply air conduit 38 and into the treating chamber 34, as illustrated by the flow vectors. The air may be heated by the heater 42. Air may be vented through the exhaust air conduit 44 to remove moisture from the treating chamber 34. During the cycle, treating chemistry may be dispensed into the treating chamber 34. Also during the cycle, output generated by the temperature sensor 50 and any additional sensors 52 may be utilized to generate digital data corresponding to sensed operational conditions inside the treating chamber 34. The output may be sent to the controller 14 for use in calculating operational conditions inside the treating chamber 34, or the output may be indicative of the operational condition.

Responsive to the output being received, the controller 14 processes the output for storage in the memory 70. The controller 14 may convert the output during processing such that it may be properly stored in the memory 70 as digital data. The stored digital data may be processed in a buffer memory, and used, along with pre-selected coefficients, in algorithms to electronically calculate various operational conditions, such as a degree of wetness or moisture content of the laundry. The controller 14 may use both the cycle modifiers specified by the user and the additional information obtained by the sensors 50, 52 to carry out the desired cycle of operation.

Figure 5:
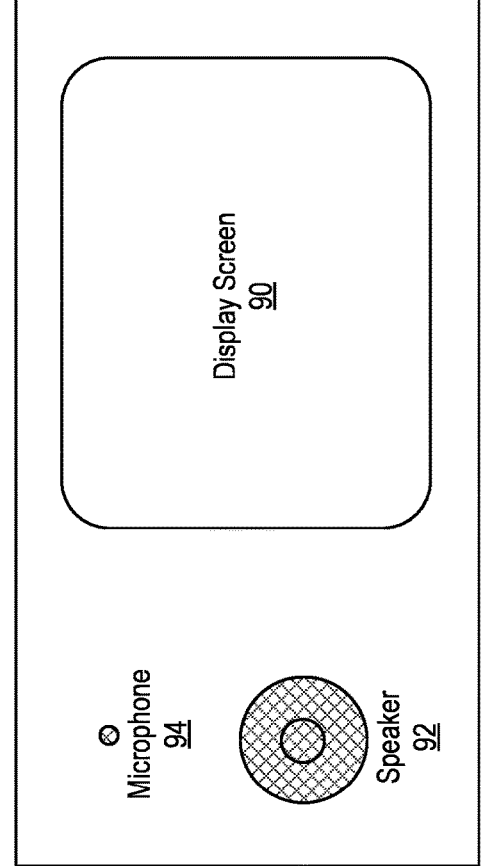
FIG. 5 is an example of an additional portion of the user interface of the clothes dryer of FIG. 1.

FIG. 5 illustrates an example additional portion the user interface 16 of the clothes dryer 10. Using the user interface 16, the controller 14 may provide an indication to the user that the cycle has been completed. In an example, the controller 14 may provide a message to a display screen 90 of the user interface 16 indicating that the cycle is complete. In another example, the controller 14 may utilize a speaker 92 or other sound producing component of the user interface 16 such as a buzzer to provide an audible indication that the cycle has been completed.

Responsive to the indication of a complete cycle, the user may return to the clothes dryer 10. Using the user interface 16, the controller 14 may instruct the clothes dryer 10 to ask a series of questions about the completed dryer cycle, where the answers to the questions are used to indicate modifiers that will be automatically selected by the controller 14 for the next cycle to account for the user feedback.

The questions asked to the user may relate to dryness and wrinkles in the load. The modifiers to the cycle may include to increase or decrease dryer temperature, to lengthen or shorten the drying time, to manage cool down phase, etc., as compared to the defaults for the selected cycle.

Figure 6A:
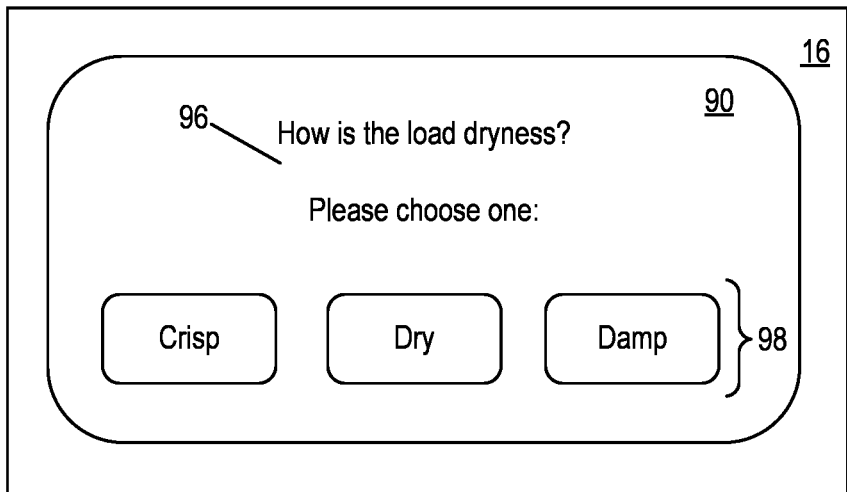
FIG. 6A illustrates a first example question provided to solicit feedback about the completed cycle from the user.
Figure 6B:
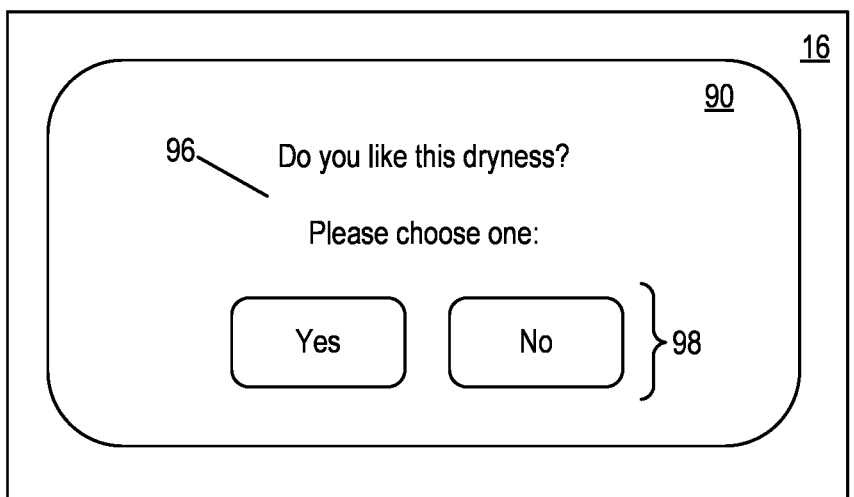
FIG. 6B illustrates a second example question provided to solicit feedback about the completed cycle from the user.
Figure 6C:
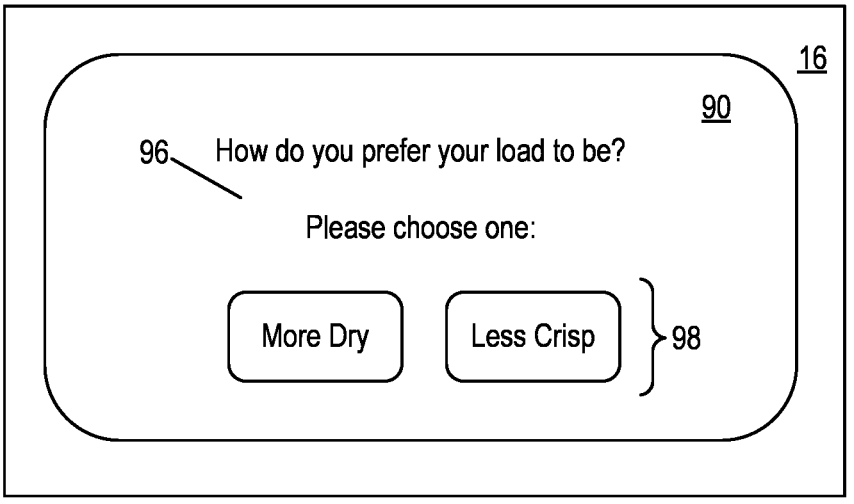
FIG. 6C illustrates a third example question provided to solicit feedback about the completed cycle from the user.

FIGS. 6A-C illustrate example questions provided to solicit feedback about the completed cycle from the user via the user interface 16. In each of FIGS. 6A-6C, a question 96 is provided on the display screen 90, along with a set of answer buttons 98 configured to receive the answer to the question 96.

In FIG. 6A, the question 96 asks how the load is, and the answer buttons 98 allow the user to choose from crisp, dry, and damp. In FIG. 6B, the question 96 asks if the user likes the dryness, and the answer buttons 98 allow the user to choose from yes or no. In FIG. 6C, the question 96 asks how the user prefers the load to be, and the answer buttons 98 allow the user to choose from more dry or less crisp.

In an example, the controller 14 may show the user interface 16 of FIG. 6C only if the user selects no from the user interface 16 of FIG. 6B. In another example, the controller 14 may refrain from asking the questions 96 if the same type of load or cycle is selected and the user has previously indicated using the questions 96 that the dryness is satisfactory (e.g., having previously selected yes from a user interface 16 such as that of FIG. 6B). The controller 14 may again ask the questions 96 if a different type of load or cycle is selected.

While the examples of the questions 96 are shown as a visual display using the display screen 90, in other examples, the question 96 may be asked and answered using a voice interface (e.g., using the speaker 92 and a microphone 94). In another example, the questions 96 may be provided via a connected app on a smartphone connected to the clothes dryer 10.

The previously described clothes dryer 10 provides the structure for the implementation of aspects of the present disclosure. Several embodiments of the method will now be described in terms of the operation of the clothes dryer 10. The embodiments of the method function to ensure proper drying of a load of laundry, as well as aspects of dryer performance improvement feature based on the user feedback.

Figure 7:
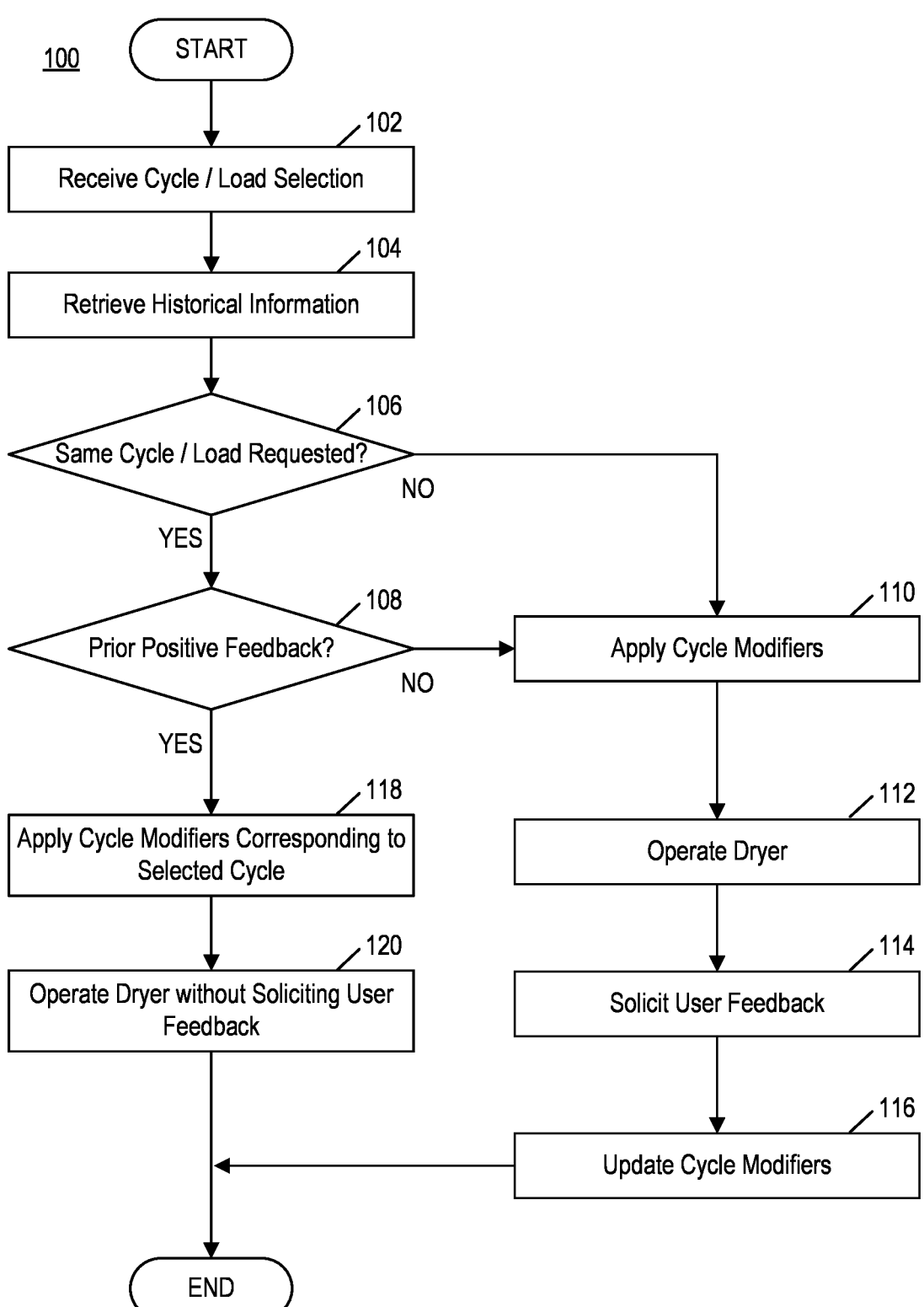
FIG. 7 illustrates an example process for the operation of the clothes dryers to solicit user feedback with respect to a completed cycle.

FIG. 7 illustrates an example process 100 for the operation of the clothes dryers 10 to solicit user feedback with respect to a completed cycle. In an example, the process 100 may be performed by the controller 14 in the context of the clothes dryer 10.

At operation 102, the controller 14 receives a selection of a cycle of operation. In an example, a user may utilize the cycle selection dial 80 of the user interface 16 to select the cycle of operation. In another example, the controller 14 may receive a selection of the load size from the user. Or, the controller 14 may infer the load size based on various techniques such as weighing the load using weight sensors in the drum 28, cameras in the drum 28, measuring torque required by the motor 46 to rotate the drum 28, etc.

At operation 104, the controller 14 retrieves historical information with respect to prior use of the clothes dryer 10. In an example, the controller 14 may maintain, to the memory 70, information indicative of the selections from the previous cycle, and may retrieve information indicative of the previous cycle and or load processed by the clothes dryer 10. This information may also include cycle modifiers for the previous cycle.

At operation 106, the controller 14 determines whether the same cycle and/or load has been selected as compared to the previous time the clothes dryer 10 was operated. For instance, the controller 14 may compare the selected cycle received at operation 102 to the previous cycle and/or load retrieved at operation 104. If the same cycle has been requested, control passes to operation 108. Otherwise, control passes to operation 110.

At operation 108, the controller 14 determines whether positive feedback was received to the controller 14 with respect to the prior use of the clothes dryer 10 for the same cycle. For example, if the user indicated satisfaction with the level of dryness (e.g., via answering affirmatively to the user interface 16 shown in FIG. 6B), then that may be an example of positive feedback. If, however, the user indicated that the load was crispy or wet, then that may be an example of negative feedback. If the feedback from the prior load was positive, control passes to operation 118. Otherwise, control passes to operation 110.

At operation 110, the controller 14 applies cycle modifiers. These cycle modifiers may include default settings for the chosen cycle. For instance, these default settings may include temperature modifiers, dryness level modifiers, wrinkle prevision modifiers, chemistry dispensing modifiers, load size modifiers, load color modifiers, etc. for the chosen cycle and/or load.

At operation 112, the controller 14 operates the clothes dryer 10. In an example, the controller 14 may control the operation of the rotatable drum 28, the fan 40 and the heater 42 in accordance with the user-selected cycle and cycle modifiers to implement the cycle of operation to dry the laundry.

At operation 114, the controller 14 solicits user feedback. In an example, responsive to completion of the cycle, the controller 14 may ask a series of questions 96 about the completed dryer cycle, where the answers to the questions 96 are used to indicate modifiers that will be automatically selected by the controller 14 for the next cycle to account for the user feedback. The questions 96 asked to the user may relate to dryness and wrinkles in the load. Example questions 96 are discussed in detail above with respect to FIGS. 6A-6C.

At operation 116, the controller 14 updates cycle modifiers for the next cycle of the same type. The modifiers to the cycle may include to increase or decrease dryer temperature, to lengthen or shorten the drying time, to manage cool down phase, etc. In an example, if the user indicated based on the questions 96 that the load was too crisp, then the cycle modifiers may be modified to shorten the drying time and/or to decrease dryer temperature. In another example, if the user indicated based on the questions 96 that the load was too wet, then the cycle modifiers may be modified to increase the drying time and/or to increase dryer temperature. These updates to the cycle modifiers may be stored to the memory 70 and used for future cycles matching the same cycle and/or load. By maintaining these updates to different cycle and load combinations, the clothes dryer 10 may accordingly learn improved default parameters for the user. After operation 116, the process 100 ends.

At operation 118, coming from operation 108, the controller 14 applies cycle modifiers corresponding to the selected cycle and/or load without soliciting user feedback. Thus, the answers to the questions 96 from the prior cycle may be used to indicate modifiers that will be automatically selected by the controller 14 for the next cycle to account for the customer feedback. At operation 120, the controller 14 operates the clothes dryer 10. After operation 120, the process 100 ends.

Variations on the process 100 may be performed. In an example, if the user opens the door 26 of the clothes dryer 10 before the cycle is complete, and does not add or remove items (e.g., as detected using the weight sensor) and then continue the cycle (e.g., as detected by pressing the power button 88 to resume the cycle), then this may also be used as feedback from the user that the cycle length is too long. In such a case, the modifiers for the cycle and/or load may be updated to decrease the cycle length. In another example, if the user runs an additional cycle of the clothes dryer 10 without emptying the dryer (e.g., as noted via load, camera, or other sensors of the clothes dryer 10), then this may serve as feedback from the user that the cycle length is too short. In such a case, the modifiers for the cycle and/or load may be updated to increase the cycle length.

In another variation, if the user changes to a different cycle of operation, the clothes dryer 10 may identify whether positive feedback was received with respect to that other cycle type, and if so, then those approved cycle modifiers may be applied to the new cycle type, without soliciting user feedback. In such an approach, desired cycle modifiers for each different cycle type may be identified and stored to the clothes dryer 10. In yet another variation, these approved cycle modifiers may be uploaded to a cloud system, and may be used to update the cycle defaults in later models of the clothes dryer 10 and/or in firmware updates to be installed to the clothes dryer 10. In such an approach, user preferences with respect to the operation of the clothes dryer 10 may be used to improve the default modifiers applied to the different automatic cycles of operation of the clothes dryer 10.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), random access memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for selecting cycle modifiers for a clothes dryer, comprising:

responsive to a requested cycle of operation for drying a load and a previous cycle being of a same cycle type, and further responsive to historical information for the previous cycle indicating positive user feedback that dryness of the load was correct:

applying cycle modifiers corresponding to the requested cycle type, and operating the clothes dryer without soliciting further user feedback; and responsive to the requested cycle and the previous cycle being different cycle types, or responsive to the historical information for the previous cycle indicating negative user feedback that the dryness of the load was incorrect:

applying the cycle modifiers corresponding to the requested cycle type, operating the clothes dryer, soliciting the further user feedback with respect to the cycle of operation of the clothes dryer, and updating the cycle modifiers, for use in future cycles of the same cycle type, based on the further user feedback.

2. The method of claim 1, wherein soliciting the further user feedback includes presenting one or more questions in a user interface, the questions asking whether the dryness of the load was correct or incorrect, where incorrect includes the load being too wet or too crisp.

3. The method of claim 2, further comprising presenting the one or more questions via a display screen of the clothes dryer.

4. The method of claim 2, further comprising presenting the one or more questions via a speaker of the clothes dryer.

5. The method of claim 2, further comprising presenting the one or more questions via a smartphone in communication with the clothes dryer.

6. The method of claim 1, wherein the cycle modifiers include one or more of increasing temperature of the requested cycle, decreasing the temperature of the requested cycle, increasing a cycle length of the requested cycle, or decreasing the cycle length of the requested cycle.

7. The method of claim 1, wherein the cycle of operation is selected from a set of cycle types, the set including one or more of: a power dry cycle, a normal cycle, a wrinkle control cycle, a delicate cycle, a sanitize cycle, or a bedding cycle.

8. The method of claim 7, wherein the historical information includes, for each cycle of operation of the set of cycles of operation, a temperature cycle modifier indicating to use one of normal cycle temperature, lower than the normal cycle temperature, or higher than the normal cycle temperature, or a cycle length modifier indicating to use one of normal cycle length, shorter than the normal cycle length, or higher than the normal cycle length.

9. The method of claim 1, further comprising receiving an indication that a door of the clothes dryer was opened before completion of the cycle, and utilizing the indication as the negative user feedback that the dryness of the load was too dry.

10. The method of claim 1, further comprising receiving an indication that a second cycle was requested for the same load, and utilizing the indication as the negative user feedback that the dryness of the load was too wet.

11. A clothes dryer for selecting automatic cycle modifiers, comprising:

a memory storing historical information for each cycle type of a plurality of different types of cycles of operation of the clothes dryer;

a user interface; and a controller, programmed to responsive to a requested cycle of operation for drying a load and a previous cycle being the same cycle type, and further responsive to the historical information for the previous cycle indicating positive user feedback that dryness of the load was correct:

apply cycle modifiers corresponding to the requested cycle type, and operate the clothes dryer without soliciting further user feedback, and responsive to the requested cycle and the previous cycle being different cycles of operation, or responsive to the historical information for the previous cycle indicating negative user feedback that the dryness of the load was incorrect:

apply the cycle modifiers corresponding to the requested cycle type, operate the clothes dryer, solicit the further user feedback with respect to the cycle of operation of the clothes dryer, and update the cycle modifiers, for use in future cycles of the same cycle type, based on the further user feedback.

12. The clothes dryer of claim 11, wherein to solicit the further user feedback includes to present one or more questions in the user interface, the questions asking whether the dryness of the load was correct or incorrect, where incorrect includes the load being too wet or too crisp.

13. The clothes dryer of claim 12, wherein the controller is further programmed to present the one or more questions via a display screen of the clothes dryer.

14. The clothes dryer of claim 12, wherein the controller is further programmed to present the one or more questions via a speaker of the clothes dryer.

15. The clothes dryer of claim 12, wherein the controller is further programmed to present the one or more questions via a smartphone in communication with the clothes dryer.

16. The clothes dryer of claim 11, wherein the cycle modifiers include one or more of increasing temperature of the requested cycle, decreasing the temperature of the requested cycle, increasing a cycle length of the requested cycle, or decreasing the cycle length of the requested cycle.

17. The clothes dryer of claim 11, wherein the cycle of operation is selected from the plurality of different cycles of operation, the plurality of different cycles of operation of the clothes dryer including one or more of: a power dry cycle, a normal cycle, a wrinkle control cycle, a delicates cycle, a sanitize cycle, or a bedding cycle.

18. The clothes dryer of claim 17, wherein the historical information includes, for each of the plurality of different cycles of operation, a temperature cycle modifier indicating to use one of normal cycle temperature, lower than the normal cycle temperature, or higher than the normal cycle temperature, or a cycle length modifier indicating to use one of normal cycle length, shorter than the normal cycle length, or higher than the normal cycle length.

19. The clothes dryer of claim 11, wherein the controller is further programmed to one or more of:

receive an indication that a door of the clothes dryer was opened before completion of the cycle, without continuation of the cycle with the same load, and utilize the indication as the negative user feedback that the dryness of the load was too dry; or receive an indication that a second cycle was requested for the same load, and utilize the indication as the negative user feedback that the dryness of the load was too wet.

20. A non-transitory computer-readable medium comprising instructions that, when executed by a controller of a clothes dryer, cause the clothes dryer to perform operations including to:

store, to a memory of the clothes dryer, historical information for each cycle of a plurality of different cycles of operation of the clothes dryer;

responsive to a requested cycle of operation for drying a load and a previous cycle being the same cycle type, and further responsive to the historical information for the previous cycle indicating positive user feedback that dryness of the load was correct:

apply cycle modifiers corresponding to the requested cycle type, and operate the clothes dryer without soliciting further user feedback, and responsive to the requested cycle and the previous cycle being different cycles of operation, or responsive to the historical information for the previous cycle indicating negative user feedback that the dryness of the load was incorrect:

apply the cycle modifiers corresponding to the requested cycle type, operate the clothes dryer, solicit the further user feedback with respect to the cycle of operation of the clothes dryer, and update the cycle modifiers, for use in future cycles of the same cycle type, based on the further user feedback.

* * * * *